United States Patent
Currier et al.

(10) Patent No.: US 12,209,653 B1
(45) Date of Patent: Jan. 28, 2025

(54) DECENTRALIZED EMERGENCY LUBRICATION SYSTEM

(71) Applicant: Zulu Pods, Inc., Davie, FL (US)

(72) Inventors: Todd M. Currier, Davie, FL (US); Robert Sladen, Davie, FL (US); Adam Smedresman, Davie, FL (US)

(73) Assignee: Zulu Pods, Inc., Davie, FL (US)

( * ) Notice: Subject to any disclaimer, the term of this patent is extended or adjusted under 35 U.S.C. 154(b) by 0 days.

(21) Appl. No.: 17/572,325

(22) Filed: Jan. 10, 2022

(51) Int. Cl.
*F16H 57/04* (2010.01)

(52) U.S. Cl.
CPC ..... *F16H 57/0442* (2013.01); *F16H 57/0445* (2013.01); *F16H 57/045* (2013.01); *F16H 57/0456* (2013.01)

(58) Field of Classification Search
CPC ............... F16H 57/0442; F16H 57/045; F16H 57/0445; F16H 57/0456; F01M 5/025; F01M 2005/028; F16N 21/04
See application file for complete search history.

(56) References Cited

U.S. PATENT DOCUMENTS

| | | | | |
|---|---|---|---|---|
| 1,717,166 A * | 6/1929 | Murphy | ............... | F16N 21/04 222/259 |
| 1,717,814 A * | 6/1929 | Strong | ............... | F16N 13/20 417/291 |
| 2,214,485 A * | 9/1940 | Short | ............... | F16H 57/0458 184/6.12 |
| 2,343,492 A * | 3/1944 | Bartolett | ............... | F16H 57/0456 184/6.12 |
| 5,099,715 A * | 3/1992 | Baiker | ............... | F16H 57/0456 184/6.12 |
| 5,655,495 A * | 8/1997 | Richards | ............... | F01M 5/025 184/6.3 |
| 5,694,896 A * | 12/1997 | Melvin | ............... | F01M 5/025 184/6.3 |
| 6,189,656 B1 * | 2/2001 | Morgenstern | ............... | F16N 17/06 184/7.4 |
| 6,216,822 B1 * | 4/2001 | May | ............... | F16N 11/08 184/26 |
| 8,459,413 B2 | 6/2013 | Gmirya et al. | | |
| 8,534,921 B2 * | 9/2013 | Iwakami | ............... | B63H 23/321 384/473 |
| 8,602,166 B2 | 12/2013 | Mullen et al. | | |
| 9,599,212 B2 * | 3/2017 | Poster | ............... | F01M 1/18 |
| 2003/0115977 A1 * | 6/2003 | Holweg | ............... | F16C 19/52 702/113 |

(Continued)

*Primary Examiner* — Minh Truong
(74) *Attorney, Agent, or Firm* — Maynard Nexsen PC; Todd A. Serbin

(57) ABSTRACT

A system for a decentralized emergency lubrication system including a dispenser assembly, a pressure supply assembly, a gearbox assembly, and an electronic assembly. Self-contained packaged oil delivery dispensers that generate its own pressure supply independent of a pump. It is possible to design systems of these packaged oil delivery systems which are strategically placed in a gearbox housing to provide the optimal amount of lubrication during a loss of lubrication (LOL) event. The benefit of dispensers driven LoL solution is that the technology is decentralized in nature, meaning that the supply of pressure does not rely on a single pump or the plumbing of nozzles to a pump. Dispensers offer system redundancy as well as the option to place satellite units strategically mounted in a gearbox housing.

12 Claims, 4 Drawing Sheets

(56) References Cited

U.S. PATENT DOCUMENTS

Figure 1:
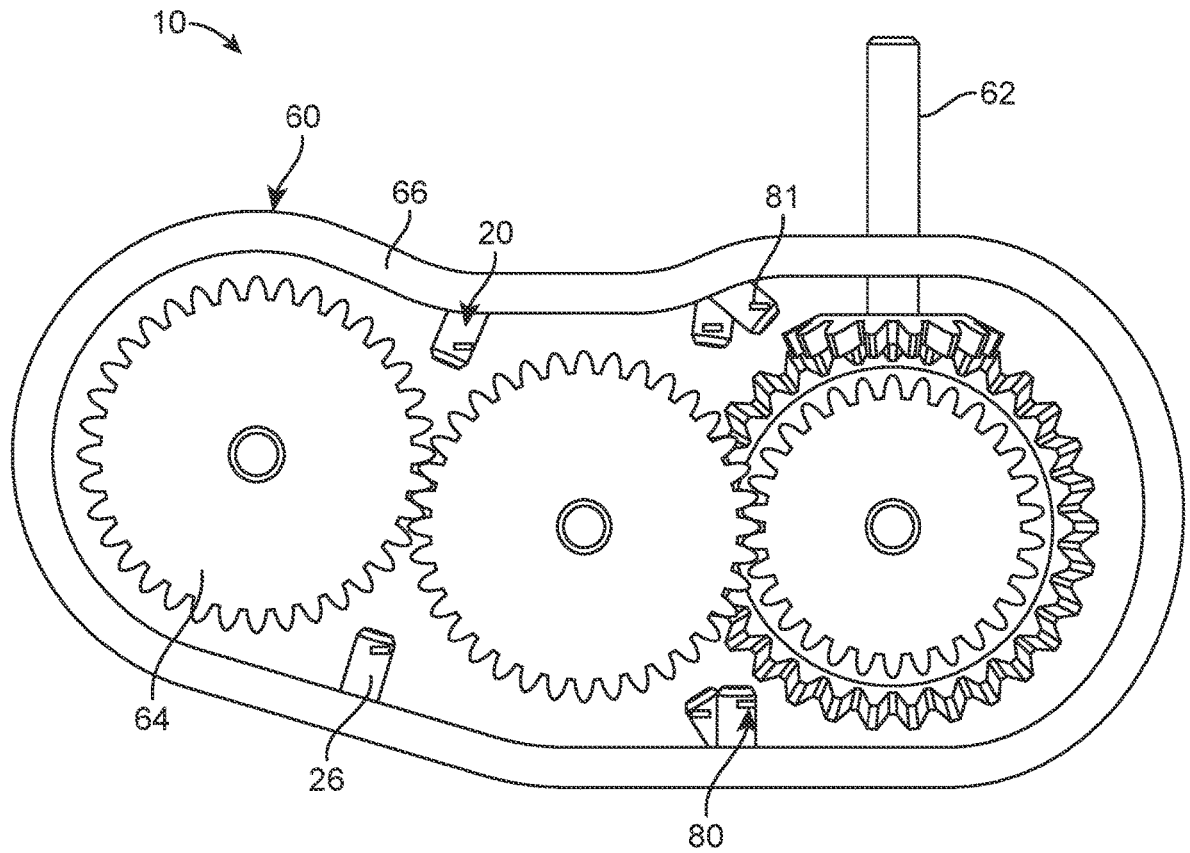

| | | | |
|---|---|---|---|
| 2004/0197040 A1* | 10/2004 | Walker | F16C 41/008 |
| | | | 384/624 |
| 2010/0018807 A1* | 1/2010 | Grenfeldt | F16H 57/0456 |
| | | | 184/6.12 |
| 2012/0157256 A1* | 6/2012 | Takeuchi | F03D 15/00 |
| | | | 475/159 |
| 2014/0238742 A1* | 8/2014 | Borek | E21D 9/1093 |
| | | | 175/227 |
| 2016/0084369 A1* | 3/2016 | Poster | F16N 7/00 |
| | | | 184/6.12 |
| 2023/0142640 A1* | 5/2023 | Duerinckx | F16N 29/04 |
| | | | 184/105.3 |

* cited by examiner

DECENTRALIZED EMERGENCY LUBRICATION SYSTEM

II. BACKGROUND OF THE INVENTION

1. Field of the Invention

The present invention relates to a decentralized emergency lubrication system and, more particularly, to a decentralized emergency lubrication system that includes a plurality of self-pressured oil dispensers inside a gearbox housing.

2. Description of the Related Art

Several designs for lubrication systems have been designed in the past. None of them, however, include a plurality of decentralized oil dispensers located inside a gearbox housing. The multiple location of oil dispensers improves system redundancy and removes single point failures in existing centralized lubrication systems.

Applicant believes that a related reference corresponds to U.S. Pat. No. 8,459,413B2 issued for a lubrication system with prolonged loss of lubricant operation. Applicant believes that another related reference corresponds to U.S. Pat. No. 8,602,166B2 issued for a secondary lubrication system with injectable additive. None of these references, however, teach of a decentralized emergency lubrication system having a collection of self-contained lubrication systems placed at strategic satellite locations optimally selected to provide emergency lubrication to bearings and gears in the event of a loss of lubrication (LOL) event.

Other documents describing the closest subject matter provide for a number of more or less complicated features that fail to solve the problem in an efficient and economical way. None of these patents suggest the novel features of the present invention.

III. Summary of the Invention

It is one of the objects of the present invention to provide a decentralized emergency lubrication system that is focused on providing lubrication by packaging oil and bringing it closer to the working zone.

It is another object of this invention to provide a decentralized emergency lubrication system that minimizes the number of parts needed to enable oil transport.

It is another object of this invention to provide a decentralized emergency lubrication system that provides an aircraft with an additional amount of predetermined time of safe operation after a loss of lubrication event.

It is another object of this invention to provide a decentralized emergency lubrication system that is placed strategically inside a gearbox housing to provide the optimal amount of lubrication during a loss of lubrication event.

It is another object of this invention to provide a decentralized emergency lubrication system with a self-contained pressurized system independent of a pump.

It is still another object of the present invention to provide a decentralized emergency lubrication system.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

IV. BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents a gearbox assembly 60 having a gearbox housing 66, gears 64 and a tower shaft 62. A plurality of the dispensers 26 devices with embedded sensors 81 are located strategically inside the gearbox housing 26

Figure 2:
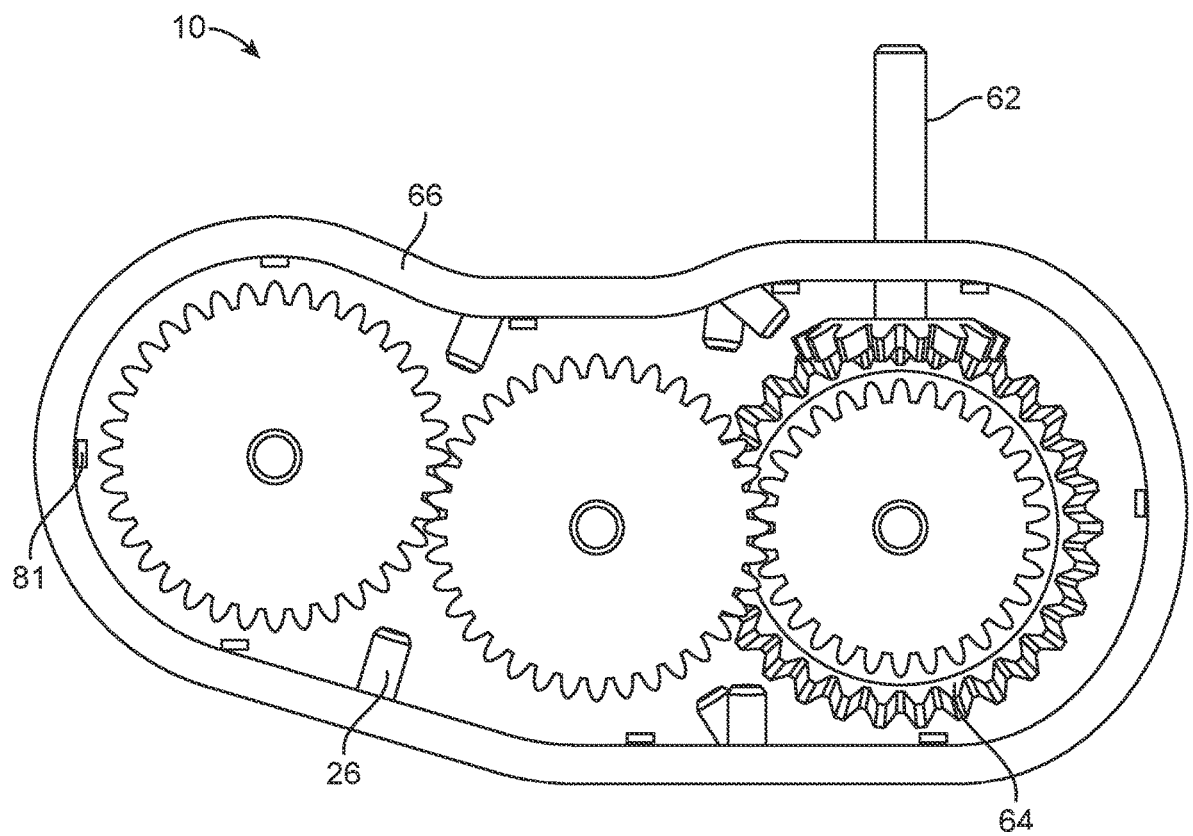

FIG. 2 is a representation of a gearbox housing 66 having gears 64. A plurality of the dispensers 26 and sensors 81 are located strategically inside the gearbox housing 66.

Figure 3:
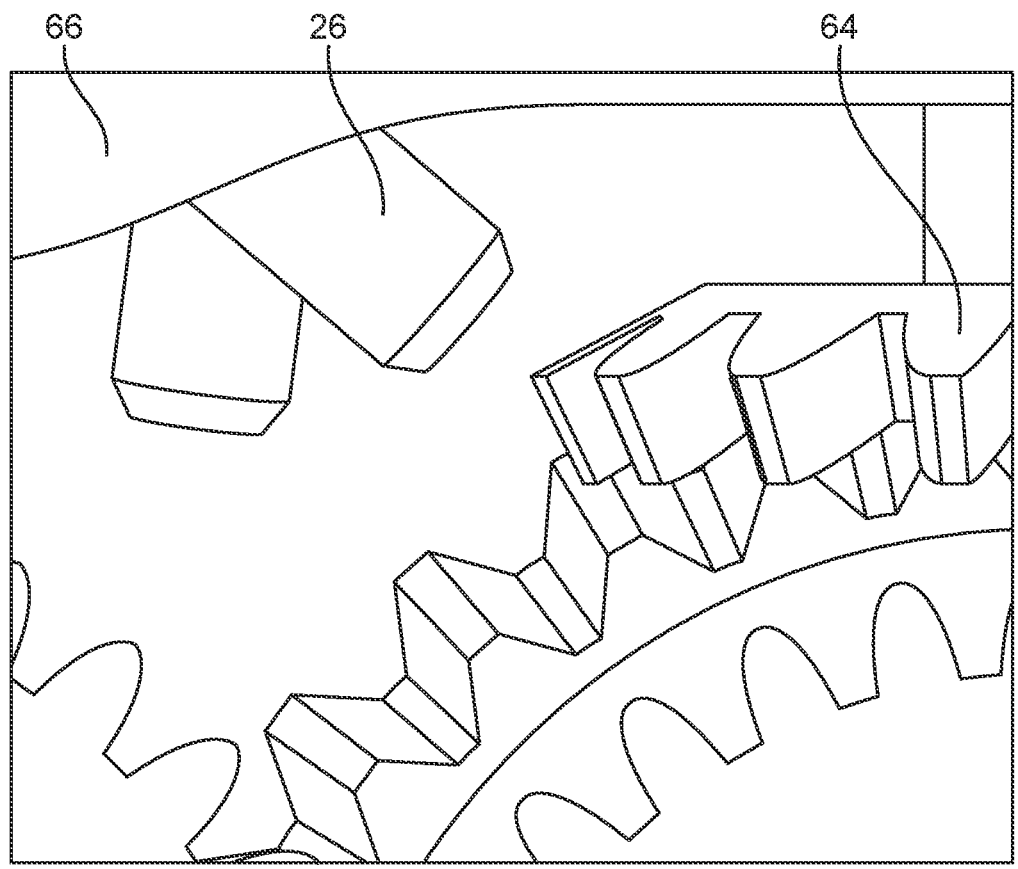

FIG. 3 is an enlarged view of the dispensers 26 being placed not entirely orthogonal to the interior of the gearbox housing 66 but having a tilt angle that allows the dispensers 26 to better aim predetermined sections of the gears 64 to provide optimal lubrication for a short period of time.

Figure 4:
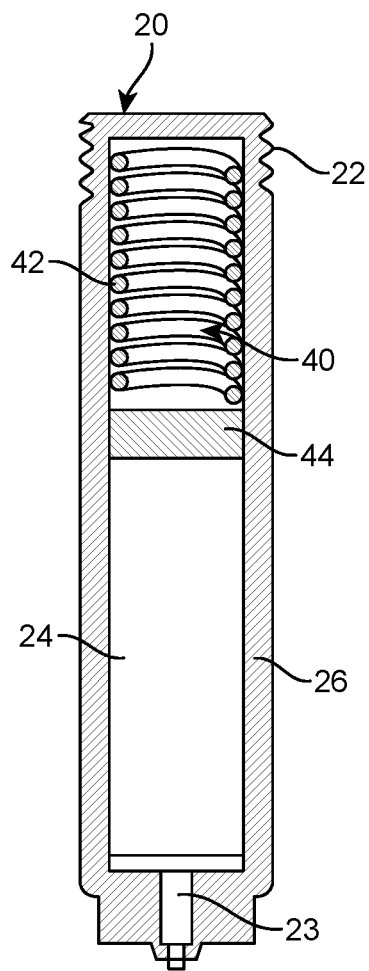

FIG. 4 shows an embodiment of the dispenser 26 being pressured mechanically by a spring 42 and a plunger 44.

Figure 5:
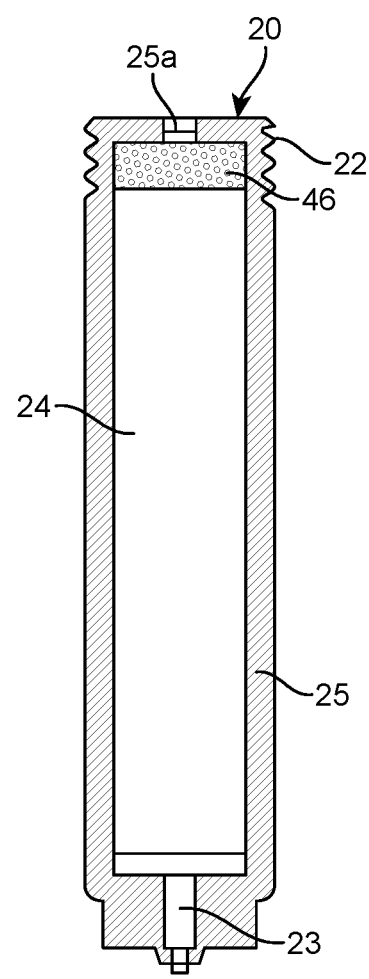

FIG. 5 illustrates a different embodiment of the dispenser 26 defined as a pressurized gas housing 25 having an inlet 25a that permits to introduce a gas inside the reservoir 24.

V. DETAILED DESCRIPTION OF THE EMBODIMENTS OF THE INVENTION

Referring now to the drawings, where the present invention is generally referred to with numeral 10, it can be observed that it basically includes a dispenser assembly 20, a pressure supply assembly 40, a gearbox assembly 60, and an electronic assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The dispenser assembly 20 including a threaded portion 22, a valve 23, a reservoir 24, a pressurized gas housing 25, an inlet 25a, and a dispenser 26. The dispenser 26 is a device meant for providing lubrication. The dispenser 26 may be an enclosure that serves as a housing for the oil reservoir 24, the valve 23, and the pressure supply assembly 40. Dispenser 26 may be compact and volumetrically suitable to be mounted inside a gearbox housing and around any mechanical system. Dispenser 26 may be substantially hollow. The dispenser 26 may be made of a resistant, durable, sturdy material. In one embodiment the dispenser 26 is made of a high strength material, capable of resisting a wide range of severely corrosive environments, pitting and crevice corrosion. Dispenser 26 may also display high yield, tensile, and creep-rupture properties at high temperatures. In a suitable embodiment the dispenser 26 may be made of an engineering material. In other embodiments the dispenser 26 may be made of carbon steel, alloy steel, stainless steel, tool steel, brass, bronze, iron, aluminum, nickel-based alloy, ceramics, polymers, fibers, metal alloy, composite materials, or any variation thereof. In a suitable embodiment the dispenser 26 has a substantially cylindrical shape. Nonetheless, in other embodiments the dispenser 26 may have a cuboid shape, a quadrangular shape, or the like. Threaded portion 22 may be located at a distal end of the dispenser 26, nonetheless, the threaded portion 22 may be located at different sections along the dispenser 26. Threaded portion 22 is an external thread. Thread portion 22 may be a right-handedness thread, or a left-handedness thread. Thread portion 22 may be tapered, or parallel. Threaded portion 22 may be defined using thread standards such as ISO thread, Unified National Thread, or the like. Valve 23 is partially enclosed by the dispenser 26. In a suitable embodiment the valve 23 may be located opposite to the threaded portion. Nevertheless, the location of the valve 23 in the dispenser 26 may be case dependent. Valve 23 permits the flow of a substance from the interior of the dispenser 26 to the exterior. Valve 23 may also permit an exterior substance to be inserted inside the dispenser 26. Valve 23 may be an actuated valve, an automatic valve, or the like. The valve 23 has a closed configuration and an opened configuration. The reservoir 24 is enclosed by the dispenser 26. In one embodiment the reservoir 24 may have a shape that conforms to the shape of the dispenser 26. However, in other embodiments the reservoir 24 may have a conic shape, a cuboid shape, an irregular shape, or any variations thereof. Reservoir 24 permits the storage of a substance. In a preferred embodiment the reservoir 24 receives and stores oil. The valve 23 enables the content of the reservoir 24 to be dispensed. Valve 23 may also permit the filling of the reservoir 24. Valve 23 may also contain flow limiting features to reduce the pressure and flow rate of the oil, said limiting features may be said valve 23 having a predetermined outlet area, wherein said outlet may be the portion of the valve 23 from which the oil may be expelled, by changing the area of the outlet the pressure and flow rate of the oil may vary, said valve 23 being made of a material that exhibits a predetermined coefficient of friction which may lower or enhance flow rate and pressure of the oil while delivered, or other suitable limitations for controlling the pressure and flow rate of a fluid as known in the art. Reservoir 24 may be volumetrically suitable for containing a predetermined amount of oil dependent on application.

The pressurized gas housing 25 is defined as an alternative embodiment of the dispenser 26. The pressurized gas housing 25 may be made of a resistant, durable, sturdy material. The pressurized gas housing 25 may be compact and volumetrically suitable to be mounted inside a gearbox housing. Pressurized gas housing 25 may be substantially hollow. In a preferred embodiment the pressurized gas housing 25 is made of an engineering material, capable of resisting a wide range of severely corrosive environments, pitting and crevice corrosion. Pressurized gas housing 25 may also display high yield, tensile, and creep-rupture properties at high temperatures. In other embodiments the pressurized gas housing 25 may be made of carbon steel, alloy steel, stainless steel, tool steel, brass, bronze, iron, aluminum, nickel-based alloy, ceramics, polymers, fibers, metal alloy, composite materials, or any variation thereof. In a suitable embodiment pressurized gas housing 25 has a substantially cylindrical shape. The pressurized gas housing 25 further includes an inlet 25a. The pressurized gas housing 25 may also include a threaded portion 22 about an exterior located at a distal end, nonetheless, the threaded portion 22 may be located whosesoever along an exterior surface of the pressurized gas housing 25. Pressurized gas housing 25 may also include a reservoir 24 volumetrically suitable for containing oil, and a valve 23 that may permit the oil to be expelled out of the pressurized gas housing 25. The inlet 25a is connected to the reservoir 24. Inlet 25a permits to introduce a pressurized gas inside the reservoir 24. In a suitable embodiment the pressurized gas is nitrogen, however, in other embodiments the pressurized gas may be oxygen, helium, argon, CO2, or other suitable gas capable of being pressurized as known in the art. Inlet 25a permits the flow of the gas in one direction only, meaning that gas cannot be expelled through the inlet 25a.

The pressure supply assembly 40 includes a spring 42, a plunger 44, and a compressed gas 46. The spring 42 is located inside the reservoir 24. Spring 42 may be a nonlinear spring or a linear spring. Spring 42 produces a constant force of a predetermined distance equivalent to a stroke of the dispenser 26. The spring 42 is attached at a distal end of the reservoir 24. The plunger 44 is mounted on top of the spring 42 defining a spring-loaded plunger that drives and displaces the oil inside the reservoir mechanically. The concatenation of the spring 42 and the plunger 44 provides a mechanical independent pressure supply. When said valve is in closed configuration the oil is pressurized by the spring force, once the valve 23 changes to the opened configuration the oil is expelled by the force exerted by the spring 42. The compressed gas 46 may be inserted into the pressurized gas housing by means of the inlet 25a. Compressed gas 46 may be an inert gas, however said pressurized gas may be from an inorganic source, an organic source, a mixed source, or any variation thereof, said compressed gas may also be air. In a suitable embodiment said compressed gas 46 may be nitrogen, nonetheless, in other embodiments the compressed gas 46 may be helium, argon, or the like. The compressed gas 46 pre-pressurize the oil contained in the reservoir 24 and displaces the oil to be expelled through the valve 23. The compressed gas 46 preserves the oil during storage and cools the oil during expansion.

In another embodiment said valve 23 may be capable of atomizing said oil defining atomized oil. Nonetheless, other means may be used to atomize said oil such as a nozzle, an atomizing nozzle, an atomizing valve, an ultrasonic atomizer, or other suitable means for atomizing as known in the art. In one embodiment wherein said atomized oil may be delivered by the pressurized gas housing 25, said atomized oil may naturally be cooled by the process of expansion of the compressed gas 46. The addition of atomized oil into the air may raise the heat capacity of the air making it a more efficient cooling fluid. The atomized oil which may be impregnated with air may be recirculated for the purpose of cooling. The atomized oil may provide better spread of small and limited quantities of oil over the elements of a mechanical system. Atomized oil may also be delivered homogeneously onto the mechanical system, this may prevent undue accumulation of oil in specific zones of the mechanical system.

The gearbox assembly 60 includes a gearbox housing 66. Said gearbox housing encloses a mechanical system. The mechanical system may include gears 64, shafts 62, bearings, seals, and other elements in a mechanical system that need lubrication for an optimal performance as known in the art. The gearbox housing 66 is a mechanical structure for enclosing mechanical systems having the aforementioned elements for providing physical protection and mechanical support. The gearbox housing 66 may be made of a durable, sturdy material. The gearbox housing 66 may be made of an aluminum alloy, iron, nickel, cobalt, steel, or any suitable material for the making of gearbox housings as known in the art. The gearbox housing 66 may have suitable shape for enclosing the mechanical system. In a preferred embodiment the gearbox housing 66 may be part of an aircraft vehicle. In other embodiments the gearbox housing 66 may be part of a motor vehicle, a watercraft vehicle, a railed vehicle, mechanical systems, or the like. Components such as gears 64, bearings, shafts, or the like, may be located inside the gearbox housing 66. The mechanical system works optimally when lubricated.

Electronic assembly 80 includes a sensor 81. Said sensor 81 is preconfigured to detect loss of lubrication events. Sensor 81 may be a sound base sensor, a position sensor, a temperature sensor, a vibration sensor, a hall effect sensor, a capacitive sensor, or other suitable sensor that may be used for measuring a loss of lubrication event. In one embodiment the sensor 81 may be preconfigured to be sensible to a sound signature of an optimally lubricated contact between operating gears, bearings, shafts, or any element included in a mechanical system that requires lubrication as known in the art. Said sound signature may have a frequency outside the human audible range. Sensor 81 may measure a sound frequency exhibited by the contact of the mechanical elements within the gearbox. In another embodiment the sensor 81 may be preconfigured to be sensitive to mechanical vibrations exhibited by elements of the mechanical system when optimally lubricated. In yet another embodiment, sensor 81 may be preconfigured to detect displacements between elements of the mechanical system because of an oil out event. In one embodiment the sensor 81 may be connected integrally to the dispenser 26. In another embodiment the sensor 81 may be attached to the gearbox housing 66. The mechanical system operating in a loss of lubrication (LOL) event may be sensed by the sensor 81. Sensor 81 may be connected to the valve 23 wirelessly or by means of electric cables. In a LoL event the sensor 81 send an activation signal for the valve 23 to change from closed configuration to opened configuration permitting the oil to be expelled. Sensor 81 may include a filter for removing unwanted frequencies that may interfere with the acquiring of the sound signature.

As depicted in FIG. 1 the dispensers 26 from the dispenser assembly 60 wherein each dispenser has a sensor 81 integrally connected, are placed at strategic satellite locations close to a working zone of the gears 64 inside the gearbox housing 66 to provide optimal lubrication. Gears 64 representing a gearbox are shown for illustrative purposes, however, it should be understood that the dispensers 26 may be mounted around various mechanical systems. Dispensers 26 may be placed inside the gearbox housing 66 close to the elements of the mechanical system. Dispensers 26 are capable of being placed orthogonally to the inner surface of the gearbox housing. However, dispensers 26 may be placed with a predetermined angle with respect to the inner surface. By placing dispensers 26 with an inclination with respect to the inner surface, the oil expelled by the dispenser may be better addressed to specific zones of the mechanical system.

As shown in FIG. 2 the sensors 81 from the digital assembly 80 and dispensers 26 from the dispenser assembly 20 are mounted strategically inside the gearbox housing 66. Gears 64 representing a gearbox are shown for illustrative purposes, however, it should be understood that the dispensers 26 may be mounted around various mechanical systems. Sensors 81 may be placed proximal to the gears 64 inside the gearbox housing 66. By placing the sensors 81 close to the working zone the acquisition of unwanted signals may be avoided, it also may be beneficial to minimize the distance the oil needs to travel to a target. The sensors 81 may turn the valve 23 into the opened configuration. With each valve 23 in opened configuration the pressurized oil stored in each dispenser 26 is expelled.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a decentralized emergency lubrication system, comprising:
    a) a dispenser assembly including a dispenser, said dispenser is an enclosure that serves as a housing for a reservoir, said dispenser having a threaded portion at a distal end, a valve, and a pressure supply assembly, said valve is internally disposed at a proximal end of the dispenser opposite to said distal and, said dispenser being mechanically fastened on an interior surface of a gearbox housing by means of said threaded portion, wherein said gearbox housing encloses a mechanical system comprising a plurality of gears and/or bearings, said reservoir receives an oil therein, the valve has an opened configuration that permits to expel the oil stored in the reservoir, the valve has a closed configuration that retains the oil inside the dispenser;
    b) the pressure supply assembly pressurizes the oil contained in the reservoir defining a pressurized oil;
    c) an electronic assembly including at least one sound or displacement sensor for sensing sound signature or displacement of mechanical components, respectively, in the mechanical system to detect a loss of lubrication event, said sensor is mounted onto the dispenser and is electrically connected to said valve, when said loss of lubrication event is detected, the sensor sends an activation signal that changes the valve from said closed configuration to said opened configuration; and
    d) a plurality of dispensers from the dispenser assembly and a plurality of corresponding sensors from the electronic assembly are mounted in multiple locations around the mechanical system in proximity of a plurality of mechanical components of the mechanical systems such that when a loss of lubrication event is detected, the sensors change the valve into said opened configuration, with each valve in said opened configuration the pressurized oil stored in each dispenser is expelled, wherein said dispensers are located proximal to the mechanical system, the dispensers are arranged at a predetermined angle relative to the interior surface of the gearbox housing to direct the pressurized oil towards the mechanical system.

2. The system of claim 1, wherein said mechanical system includes gears, or shafts, or bearings, or seals, or any combination thereof.

3. The system of claim 1, wherein said attaching-threaded portion allows the dispenser to be mechanically fastened on the gearbox housing.

4. The system of claim 1, wherein spring is located inside the reservoir, the spring attached inside the reservoir opposite to the valve, the plunger is mounted on the spring configuring a spring-loaded plunger that drives and displaces the oil inside the reservoir.

5. The system of claim 1, wherein said sensors from the electronic assembly are mounted proximal to the mechanical system to avoid an acquisition of unwanted signals such as noise.

6. The system of claim 1, wherein the release of the pressurized oil is mechanically accomplished by means of the spring and plunger.

7. The system of claim 1, wherein said reservoir is volumetrically suitable to store a predetermined amount of oil, said predetermined amount of oil lubricating the mechanical system to maintain a functionality of said mechanical system during a predetermined amount of time after a loss of lubrication event.

8. The system of claim 1, wherein said valve homogeneously expels the pressurized oil into the mechanical system.

9. A system for a decentralized emergency lubrication system, comprising:
   a) a dispenser assembly including a dispenser, said dispenser is an enclosure that serves as a housing for a reservoir, said dispenser having a threaded portion at a distal end, a valve, and a pressure supply assembly, said valve is internally disposed at a proximal end of the dispenser opposite to said distal end, said dispenser is volumetrically suitable to be mounted around a mechanical system comprising a plurality of gears and/or bearings, said dispenser being mechanically fastened on an interior surface of a gearbox housing by means of said threaded portion, wherein said gearbox housing encloses a mechanical system, said reservoir receives an oil therein, the valve has an opened configuration that permits to expel the oil stored in the reservoir, the valve has a closed configuration that retains the oil inside the dispenser, said reservoir is volumetrically suitable to store a predetermined amount of oil, said predetermined amount of oil is configured to efficiently lubricate the mechanical system to work effectually during a predetermined amount of time during a loss of lubrication event;
   b) the pressure supply assembly permits to pressurize the oil contained in the reservoir defining a pressurized oil;
   c) an electronic assembly including at least one sound or displacement sensor for sensing sound signature or displacement of mechanical components, respectively, in the mechanical system to detect a loss of lubrication event, said sensor is mounted onto the dispenser and is electrically connected to said valve, when a loss of lubrication event is detected, the sensor sends an activation signal that changes the valve from said closed configuration to said opened configuration; a gearbox assembly having said gearbox housing, said mechanical system further includes gears, or shafts, or bearings, or seal; and
   d) a plurality of dispenser from the dispenser assembly and a plurality of corresponding sensors from the electronic assembly are mounted in multiple locations around the mechanical system in proximity to the gears and/or bearings of the mechanical system, the dispensers are arranged at a predetermined angle relative to the interior surface of the gearbox housing to direct the pressurized oil towards the mechanical system, when the loss of lubrication event is detected, the sensors change the valve into said opened configuration, with each valve in said opened configuration the pressurized oil stored in each dispenser is expelled into said mechanical system, said dispensers from the dispenser assembly are mounted proximal to the mechanical system to minimize a distance the oil needs to travel to a target.

10. The system of claim 1, wherein said reservoir includes an inlet.

11. The system of claim 10, wherein said pressure supply assembly includes a compressed gas that is introduced into said reservoir through said inlet, said compressed gas preserves the oil contained by the reservoir during storage and cools the oil during expansion.

12. The system of claim 11, wherein the release of the pressurized oil is accomplished by means of the compressed gas.

* * * * *